United States Patent [19]

Hartig et al.

[11] Patent Number: 4,782,718
[45] Date of Patent: Nov. 8, 1988

[54] FLY-WHEEL UNIT FOR AN INTERNAL-COMBUSTION ENGINE

[75] Inventors: Franz Hartig, Dittelbrunn; Friedrich Kittel, Schweinfurt; Manfred Caspar, Oberwerrn; Bernhard Schierling, Kürnach; Norbert Pieper, Lengerich; Alfred Schraut, Waigolshausen; Werner Wiesner; Wolfgang Grosspietsch, both of Schweinfurt, all of Fed. Rep. of Germany

[73] Assignee: Fichtel & Sachs AG, Schweinfurt, Fed. Rep. of Germany

[21] Appl. No.: 857,240

[22] Filed: Apr. 29, 1986

[30] Foreign Application Priority Data

May 3, 1985 [DE] Fed. Rep. of Germany ....... 3515928

[51] Int. Cl.⁴ .......................... F16F 15/10; F16D 3/14
[52] U.S. Cl. .................... 74/574; 132/106.2; 132/106.1; 464/27; 464/66
[58] Field of Search ...................... 74/574, 573 F, 572; 192/106.2, 70.17, 106.1, 30; 464/24, 27, 68, 67, 66

[56] References Cited

U.S. PATENT DOCUMENTS

| 2,337,134 | 12/1943 | Thelander | 464/27 |
|---|---|---|---|
| 2,513,379 | 7/1950 | Thelander | 464/27 |
| 3,528,265 | 9/1970 | Brinson | 464/27 |
| 4,148,200 | 4/1979 | Schallhorn et al. | 464/27 |
| 4,160,390 | 7/1979 | Spaetgens | 464/66 |
| 4,232,534 | 11/1980 | Lamarche | 192/106.2 |
| 4,555,008 | 11/1985 | Nagano | 464/27 |
| 4,560,054 | 12/1985 | Kayanoki et al. | 464/66 |
| 4,565,273 | 1/1986 | Tojima et al. | 464/68 |
| 4,591,348 | 5/1986 | Takeuchi et al. | 464/64 |
| 4,601,676 | 7/1986 | Tojima et al. | 464/24 |
| 4,616,740 | 10/1986 | Okamoto et al. | 192/106.2 |

FOREIGN PATENT DOCUMENTS 56-131851 10/1981 Japan ............................... 192/106.2

Primary Examiner—Gary L. Smith
Assistant Examiner—Vinh Luong
Attorney, Agent, or Firm—Toren, McGeady & Associates

[57] ABSTRACT

In a fly-wheel unit of any desired construction type including two separate fly-wheel members, the torsion springs are housed in a liquid receiving chamber which is at least partially filled with a lubricant or with a coolant. In this way inherent noises and excess wear can be damped and heat generation can be uniformly distributed.

6 Claims, 2 Drawing Sheets

FLY-WHEEL UNIT FOR AN INTERNAL-COMBUSTION ENGINE

BACKGROUND OF THE INVENTION

A fly-wheel unit for an internal combustion engine comprises a first fly-wheel and a second fly-wheel having a common rotational axis and being angularly movable with respect to each other about said rotational axis. A torque transmission unit is provided for torque transmission between said first fly-wheel and said second fly-wheel. Said torque transmission unit includes a central disc substantially coaxial with said fly-wheels and two cover plates on both axial sides of said central disc. At least one group of substantially axially aligned windows is provided in said central disc and said cover plates, respectively. These windows accommodate a torsion spring.

STATEMENT OF THE PRIOR ART

A fly-wheel unit of the above defined type is known from German Patent Application No. P 34 47 181.2, filed Dec. 22, 1984, corresponding to British Patent Application No. 8,530,945, filed Dec. 16, 1985, and U.S. patent application Ser. No. 812,395, filed Dec. 23, 1985. It has appeared as a problem in principle in divided fly-wheels that by way of example the torsion springs arranged in the windows are subject to very heavy stressing, whereby undesired noises and increased wear can occur.

OBJECT OF THE INVENTION

It is therefore the object of the present invention to counteract the increased wear and noise generation.

SUMMARY OF THE INVENTION

In view of the above defined object a fly-wheel unit comprises a first fly-wheel and a second fly-wheel having a common rotational axis and being angularly movable with respect to each other about said rotational axis. The first fly-wheel is provided with first fixing means for fixing it to a crank-shaft. The second fly-wheel is provided with second fixing means for fixing a clutch unit thereto. A torque transmission unit is provided for torque transmission between the first fly-wheel and the second fly-wheel. This torque transmission unit includes a central disc substantially coaxial with said fly-wheels and two cover plates on both axial sides thereof. At least one group of substantially axially aligned windows is provided in the central disc and the cover plates, respectively. These windows accommodate a torsion spring, namely a compressional spring having a spring axis substantially tangential with respect to the rotational axis and further having end portions engaging substantially radially directed edges of the windows. The central disc is connected to one fly-wheel, whereas the cover plates are connected to the other fly-wheel.

A liquid receiving chamber is provided. This liquid receiving chamber accommodates at least the torsion spring(s). The liquid receiving chamber is at least partially filled with a lubricating and/or cooling liquid.

Due to the filling of lubricant and/or coolant within the liquid receiving chamber not only can the inherent noises be effectively damped but the heavily stressed components arranged in this region are protected against excessive wear. It is especially advantageous here to form the liquid receiving chamber such as to encapsulate at least the torque transmission unit. It is, however, also possible in principle to form the entire fly-wheel unit as a liquid tight unit, but then under some circumstances difficulties arise in the assembly of the fly-wheel unit and it is therefore more advantageous to provide a smaller liquid receiving chamber within the fly-wheel unit which at least accommodates the torsion spring(s).

The liquid receiving chamber can be connected to the lubricant supply system of the internal combustion engine. Thus apart from lubrication, noise suppression and suppression of wear and at the same time a cooling effect is achieved.

The various features of novelty which characterize the invention are pointed out with particularity in the claims annexed to and forming a part of this disclosure. For a better understanding of the invention, its operating advantages and specific objects attained by its use, reference should be had to the accompanying drawings, and descriptive matter in which there are illustrated and described preferred embodiments of the invention.

BRIEF DESCRIPTION OF THE DRAWINGS

The invention will be explained in greater detail below by reference to several examples of embodiment. Individually:

FIGS. 6a and 6b are enlarged schematic sectional views taken along the line A—A in FIG. 1 showing in FIG. 6a no relative movement of the central disc and the cover plates, while FIG. 6b shows relative displacement of the central disc and the cover plates.

DETAIL DESCRIPTION OF THE DRAWINGS

Figure 1:
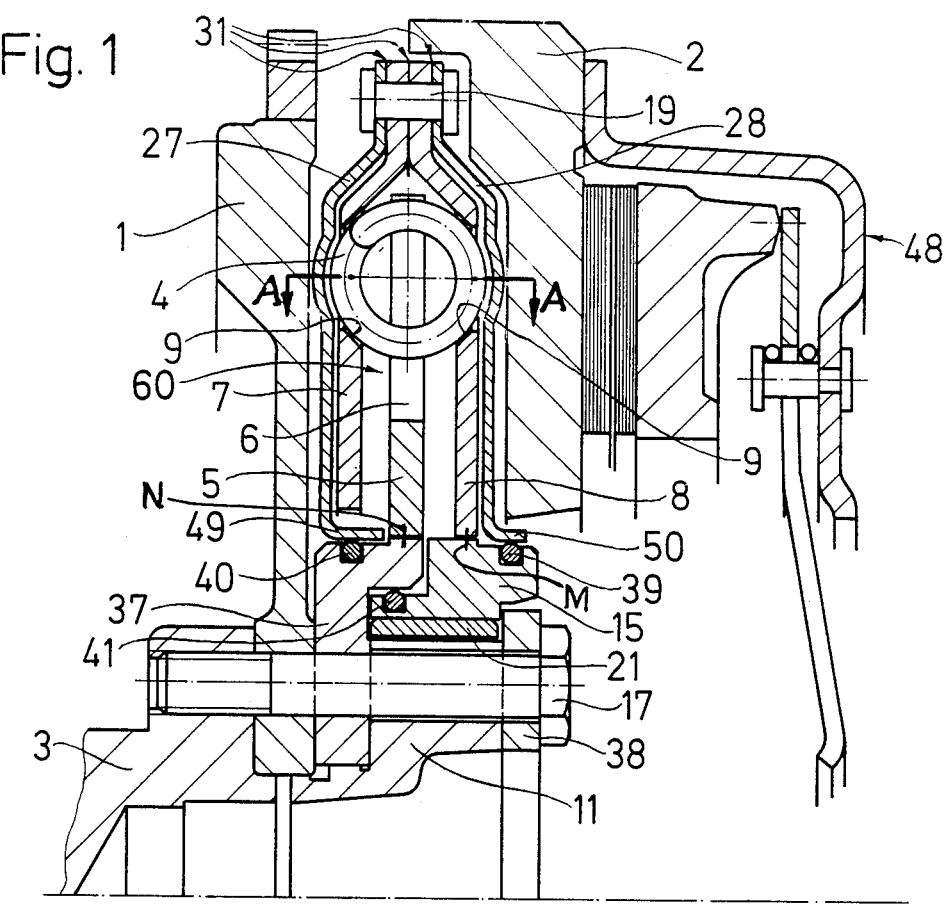
FIG. 1 shows the upper half of a longitudinal section through a fly-wheel unit.
Figure 2:
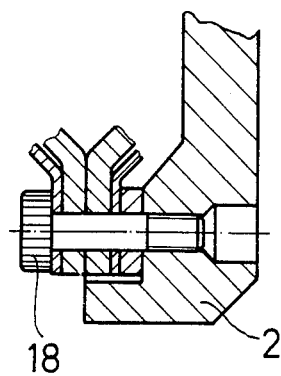
FIG. 2 shows a detail of a longitudinal section through the lower half of the fly-wheel unit according to FIG. 1.

FIGS. 1 and 2 show the upper half and a detail of the lower half of a longitudinal section through a fly-wheel unit. The fly-wheel unit is secured on the end of the crank-shaft 3 of an internal combustion engine (not shown). The first fly-wheel 1, the flange 37 with the central disc 5 and the bearing flange 11 are connected directly with the crank-shaft 3, with interposition of a cover 38, by a plurality of screws 17 uniformly distributed on the circumference. The other components are mounted rotatably by a predetermined angle in relation to these components of the fly-wheel unit connected fast in rotation with the drank-shaft 3, a torque transmission unit being interposed, note FIGS. 6a and 6b. These rotatably mounted parts include the second fly-wheel 2 with the friction clutch 48 fixedly arranged thereon, the two cover plates 7 and 8 with the flange 15 fastened thereto, the two sealing plates 27 and 28 and the bearing sleeve 21. The flange 15 is fastened to the cover plate 8 as diagrammatically indicated at M in FIG. 1. The cover plates 7 and 8 and the sealing plates 27 and 28 are firmly connected with one another in the region radially outside the torsion springs 4 by rivets 19. Furthermore, the cover plates 7, 8 and the sealing plates 27, 28 are fixed through the screws 18 according to FIG. 2 to the second fly-wheel 2. The relative rotatability between the two groups is provided by the fact that the second fly-wheel 2 with the friction clutch 48 is mounted rotatably on the bearing flange 11, the bearing sleeve 21 being interposed. The torsion springs 4 engage for one part in windows 6 forming openings in the central disc 5 and, for the other part, in open windows 9 of the cover plates 7 and 8. In the region of the torsion springs 4 the sealing plates 27, 28 are domed outwardly. During operation of the internal combustion engine this delivers a torque through the crank-shaft 3, the rotating movement possessing a high degree of irregularity. This degree of irregularity is diminished by the elastic torque transmission unit to a tolerable amount. Further damping may be obtained by friction means between the two fly-wheels. The entire torque transmission unit is encapsulated in a liquid-tight liquid receiving chamber.

Figure 6A:
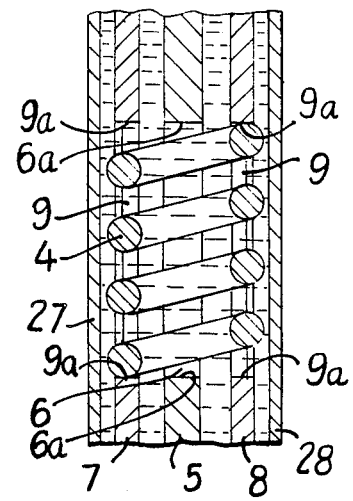
Figure 6B:
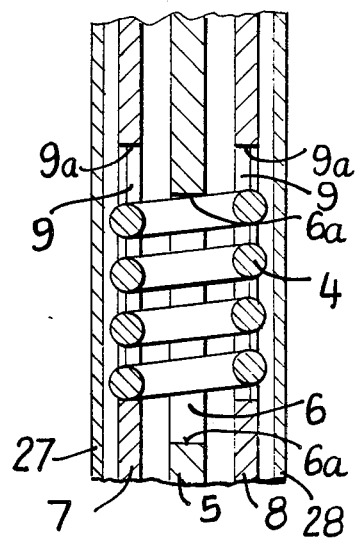

In FIG. 6a and fly-wheels 1, 2 not shown, are in the rest position, that is, there is no relative angular movement between them. In FIG. 6b the internal combustion engine has delivered a torque through the crank-shaft 3 with the displacement of the fly-wheels 1, 2 relative to one another. A schematically shown fastening means N secures the central disc 5 fast in rotation with the first fly-wheel, note FIG. 1. Further, the first fly-wheel 1 is held fast in rotation with the cover plate 7, 8 by another schematically shown fastening means M. In FIG. 6a, the radially directed edges 6a, 9c of the windows 6, 9 are in alignment, however, when the fly-wheels are displaced relative to one another the edges 6a, 9a also experience relative displacement, note FIG. 6b. Further, in FIG. 6a, the liquid receiving chamber containing the springs 4 also holds a lubricating or cooling liquid.

For this purpose the cover plates 7 and 8 and the sealing plates 27 and 28 are approached in the axial direction in the region of the rivets 19, and flat seals 31 are arranged therebetween. Thus it is possible to fill the liquid receiving chamber 60 at least partially with a lubricant or with a coolant. At least during the operation of the internal combustion engine the construction so far described would suffice, since the lubricant—considered radially from outside—would have a filling level which would have to reach only to slightly radially inward of the torsion springs 4. This lubricant or coolant has essentially the task of protecting the heavily stressed parts between the torsion springs 4 and the radially directed edges 6a and 9a of the windows 6 and 9 with which the torsion springs cooperate, against undesired wear and to diminish the noises issuing from the torsion damper device. Furthermore, this lubricant or coolant can distribute the thermal stressing, issuing during normal operation primarily from the friction clutch 48, more uniformly to many components.

Radially inward sealing will, however, not be avoidable in all cases. Therefore, additional packings are provided. Thus, by way of example, the sealing plates 27 and 28 are shaped in their radially inner region approximately in pot form with a collar 49 and 50, respectively. The cylindrical inner surfaces of these two collars 49 and 50 are used as sealing surfaces against a movement seal 40 and a stationary seal 39, respectively. Both seals are formed for example as O-rings. The movement seal is here situated between the collar 49 of the sealing plate 27 and the flange 37 which is firmly connected with the crank-shaft 3. The stationary seal 39, likewise preferably in the form of an O-ring, is situated in the flange 15 in a corresponding groove and seals off against the collar 50 of the sealing plate 28. No relative movement takes place at this point since the flange 15, the cover plate 8 and the sealing plate 28 are firmly connected with one another. A further movement seal 41 is provided between the flange 15 and the flange 37. In this case again an O-ring is used, and the two parts 15 and 37 define a slightly cylindrical gap in this region.

Figure 3:
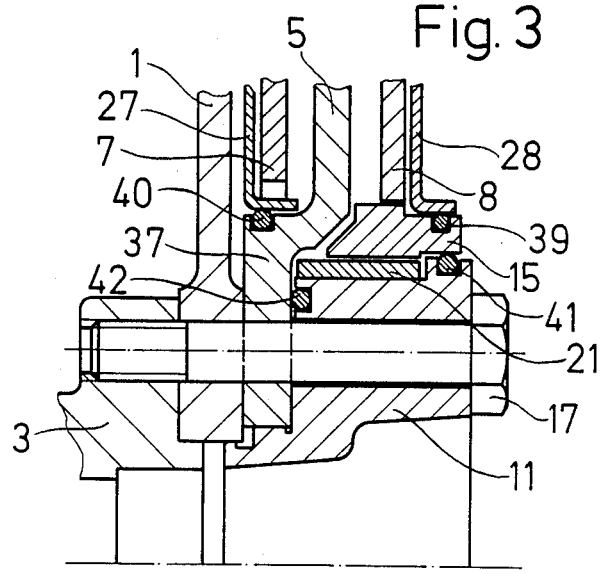
FIG. 3 shows a detail of a longitudinal section through the bearing unit mounting the second fly-wheel on the first fly-wheel.

FIG. 3 shows by way of a detail a variant of the bearing means between the second fly-wheel 2 and the first fly-wheel 1 according to FIG. 1. In this variant the bearing surface of the bearing sleeve 21 is in liquid contact with the liquid in the partially filled liquid receiving chamber 60. In this way the surfaces of the bearing means can likewise be protected with a lubricant against wear. The arrangement of the packings is so modified that the movement seal 41 has been shifted to the side of the bearing sleeve 21 remote from the internal combustion engine and here seals off directly between the bearing flange 11 and the flange 15. A further stationary seal 42 is provided here between the bearing flange 11 and the flange 37. In this way the space around the bearing sleeve 21 is for the one part made liquid-tight to the exterior in order to be subjected to the action of the lubricant, for the other part the penetration of dirt from the exterior is likewise suppressed.

Figure 5:
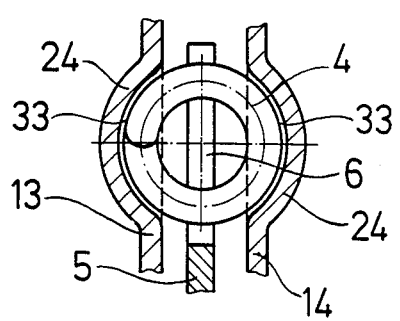
FIG. 5 shows a partial longitudinal section in the region of the torsion springs of a further variant of embodiment.

The arrangement of the sealing plates 27 and 28 according to FIGS. 1 to 3 can be saved in specific cases, in that according to FIG. 5 the cover plates 13 and 14 comprise outwardly domed portions 24 to function as windows 33 for the torsion springs 4, the external contour of the cover plates 13 and 14 thus not being interrupted. It is in this case only necessary to connect the two cover plates 13 and 14 tightly with one another radially outside the torsion springs 4, as proposed for example in FIG. 1 by a flat seal 31.

Figure 4:
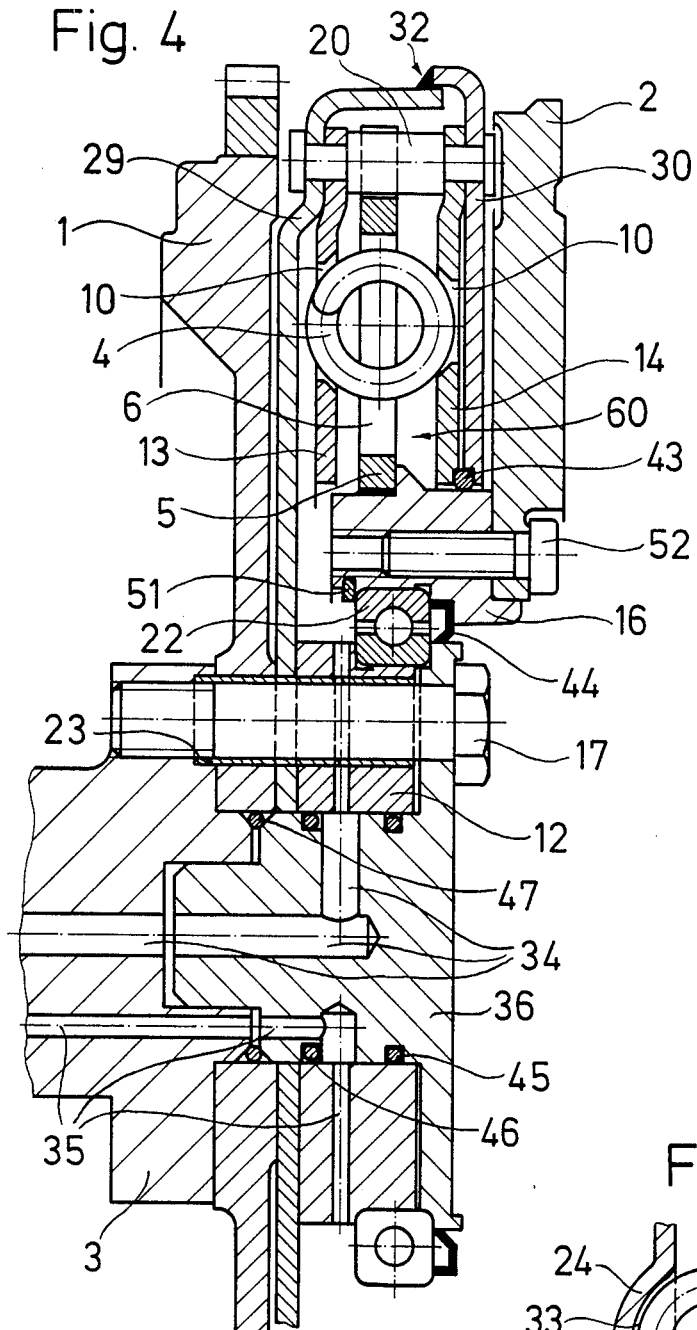
FIG. 4 shows a partial longitudinal section through a further embodiment of the fly-wheel unit.

FIG. 4 shows a variant of embodiment of a fly-wheel unit in longitudinal section. This variant of embodiment differs in the following points from the embodiments according to FIGS. 1 to 3: The relative movement between the two fly-wheels 1 and 2 is rendered possible by a roller bearing 22. Furthermore, the attachment of the second fly-wheel 2 is accomplished in its radially inner region through the flange 16 of the central disc 5. Accordingly, the two cover plates 13, 14 and the two sealing plates 29 and 30 are connected fast in rotation with the first fly-wheel 1.

As far more essential difference from the above-described forms of embodiment it is to be noted in FIG. 4 that the liquid receiving chamber 60 is connected to the lubricant oil system of the internal combustion engine. For this purpose the crank-shaft 3 comprises both inflow passages 34 and return flow passages 35. These continue in a cover 36 inserted into the crank-shaft 3. This cover 36 is held by screws 17 which firmly interconnect the crank-shaft 3, the first fly-wheel 1, the sealing plate 29 and the bearing flange 12. The roller bearing 22 is fixed on the bearing flange 12 in the axial direction by the cover 36. It carries the flange 16, the axial fixing taking place through a securing ring 51. The flange 16 is made fast with the central disc 5, which comprises windows 6 for the arrangement of the torsion springs 4. Furthermore, the second fly-wheel 2 is firmly connected with the flange 16 for example through screws 52. The attachment of the torque transmission unit to the first fly-wheel 1 takes place through the sealing plate 29 associated with the fly-wheel 1, which sealing plate 29 reaches radially inwards in accordance with the first fly-wheel 1 so far that it is held by the screws 17. Radially outside the torsion springs 4 the two cover plates 13 and 14 and the two sealing plates 29 and 30 are firmly connected with one another through rivets 20. The sealing of the liquid receiving chamber 60 radially outwards is effected in that the two sealing plates 29 and 30 are made in pot form towards one another in the axial direction and are tightly connected with one another by a welded seam 32 in the region of their mutual contact. The torsion springs 4 are here arranged in windows 6 of the central disc 5 and in windows 10 of the cover plates 13 and 14. The sealing plates 29 and 30 here serve both for sealing to the exterior and for the introduction of torque through the sealing plate 29 from the crank-shaft 3. The sealing of the liquid receiving chamber 60 in its radially inner region is effected firstly through a movement seal 43 between the flange 16 for the one part and at least the sealing plate 30 for the other part.

In the present case, however, the O-ring used as movement seal 43 is too large for arrangement in a sheet metal part, so that parts of the groove for the reception of the O-ring are provided in each of the two sheet metal parts 14 and 30, respectively, which extend substantially parallel. A further movement seal 44 is situated on the side of the roller bearing 22 remote from the internal combustion engine between the flange 16 and the cover 36. This movement seal 44 is in the present case provided in the form of a lip seal. Since in this embodiment of a fly-wheel unit the pressure oil of the internal combustion engine flows through the torsion damper device, there are further provided stationary seals 45, 46 between the cover 36 and the flange 12 on both sides of the openings of the channels 34, 35. A further stationary seal 47 is provided at the location where the cover 36, the crank-shaft 3 and the fly-wheel 1 meet. In the basic arrangement here the entire liquid receiving chamber 60 is filled with pressure oil. Due to the constant exchange of this pressure oil during operation of the internal combustion engine, in addition to the wear-reducing and noise-reducing effect, there is also a distinct temperature-equalising effect. All the components of the fly-wheel unit which are movable in relation to one another are here included in the lubricant cycle. As purely constructive measure in departure from FIG. 1, in FIG. 4 there is represented a centring bush 23 which takes over the mutual centring of the components 1, 3, 29 and 12. Moreover, at this point it should be indicated that within the torque transmission unit it is readily possible for friction devices to be provided which damp the torsional vibrations.

While specific embodiments of the invention have been shown and described in detail to illustrate the application of the inventive principles, it will be understood that the invention may be embodied otherwise without departing from such principles.

What we claim is:

1. A fly-wheel unit for an internal combustion engine comprising a first fly-wheel (1) and a second fly-wheel (2) having a common rotational axis and being limitedly angularly movable with respect to each other about said rotational axis, said first fly-wheel (1) being provided with first fixing means for fixing it to a crank-shaft (3), said second fly-wheel (2) being provided with second fixing means for fixing a clutch unit (48) thereto, a resilient torque transmission unit being provided for torque transmission between said first fly-wheel (1) and said second fly-wheel (2), said torque transmission unit including a central disc (5) substantially coaxial with said fly-wheels (1, 2) and two cover plates (7, 8) on both axial sides of said central disc (5), at least one group of substantially axially aligned windows (6, 9) being provided in said central disc (5) and said cover plates (7, 8), respectively, said windows (6, 9) of said at least one group accommodating a torsion spring (4), namely a compressional spring having a spring axis substantially tangential with respect to said rotational axis and having end portions engaging substantially radially directed edges (6a, 9a) of said windows (6, 9), said central disc (5) and said cover plates (7, 8) with the compressional spring therebetween being in torque transmitting serial connection between said fly-wheels (1, 2) and fastened to respective ones of said fly-wheels (1, 2) for common rotation therewith, a liquid receiving chamber (60) being provided, said liquid receiving chamber (60) accommodating at least said torsion spring (4), said liquid receiving chamber (60) being at least partially filled with at least one of a lubricating or cooling liquid, said liquid receiving chamber (60) being axially confined by sealing plates (27,28) which are provided axially adjacent to said cover plates (7,8) on the sides thereof, which are remote from each other, said windows (9) in said cover plates (7,8) being open windows, said liquid receiving chamber (60) being confined in radially outward direction by said sealing plates (27,28), said sealing plates (27,28) and said cover plates (7,8) approaching each other radially outward of said torsion spring (4), said cover plates (7,8) sealingly engaging each other and said sealing plates (27,28) sealingly engaging respective cover plates (7,8).

2. A fly-wheel unit for an internal combustion engine comprising a first fly-wheel (1) and a second fly-wheel (2) having a common rotational axis and being limitedly angularly movable with respect to each other about said rotational axis, said first fly-wheel (1) being provided with first fixing means for fixing it to a crank-shaft (3), said second fly-wheel (2) being provided with second fixing means for fixing a clutch unit (48) thereto, a resilient torque transmission unit being provided for torque transmission between said first fly-wheel (1) and said second fly-wheel (2), said torque transmission unit including a central disc (5) substantially coaxial with said fly-wheels (1, 2) and two cover plates (7, 8) on both axial sides of said central disc (5), at least one group of substantially axially aligned windows (6, 9) being provided in said central disc (5) and said cover plates (7, 8), respectively, said windows (6, 9) of said at least one group accommodating a torsion spring (4), namely a compressional spring having a spring axis substantially tangential with respect to said rotational axis and having end portions engaging substantially radially directed edges (6a, 9a) of said windows (6, 9), said central disc (5) and said cover plates (7, 8) with the compressional spring therebetween being in torque transmitting serial connection between said fly-wheels (1, 2) and fastened to respective ones of said fly-wheels (1, 2) for common rotation therewith, a liquid receiving chamber (60) being provided, said liquid receiving chamber (60) accommodating at least said torsion spring (4), said liquid receiving chamber (60) being at least partially filled with at least one of a lubricating or cooling liquid, said liquid receiving chamber (60) being axially confined by sealing plates (27,28) which are provided axially adjacent to said cover plates (7,8) on the sides thereof, which are remote from each other, said windows (9) in said cover plates (7,8) being open windows, one (27) of said sealing plates (27,28) being at its radially inner edge (49) sealed with respect to a part (37) fast in rotation with said first fly-wheel (1), and the other (28) of said sealing plates (27,28) being sealed at its radially inner edge (50) with respect to a part (15) fast in rotation with said second fly-wheel (2), additional sealing means (41) being provided between respective parts (37,15) fast in rotation with said first fly-wheel (1) and said second fly-wheel (2), respectively.

3. A fly-wheel unit as set forth in claim 1 or 2, said sealing plates (27,28) being fastened to said cover plates (7,8) for common rotation therewith.

4. A fly-wheel unit as set forth in claim 1 or 2, further comprising bearing means (11,21,15) for bearing said second fly-wheel (2) with respect to said first fly-wheel (1).

5. A fly-wheel unit as set forth in claim 1, said liquid receiving chamber (60) being closed at its radially inward periphery by radially inward sealing means (39,40,41).

6. A fly-wheel unit as set forth in claim 1 or 2, said torque transmission unit being located axially between said first fly-wheel (1) and said second fly-wheel (2).

* * * * *